(12) United States Patent
Wiederrecht et al.

(10) Patent No.: US 12,066,617 B2
(45) Date of Patent: Aug. 20, 2024

(54) GHOST IMAGING SECOND HARMONIC GENERATION MICROSCOPY

(71) Applicant: UCHICAGO ARGONNE, LLC, Chicago, IL (US)

(72) Inventors: Gary P. Wiederrecht, Elmhurst, IL (US); Stephen K. Gray, Wheaton, IL (US); Xiewen Wen, Willowbrook, IL (US); Sushovit Adhikari, Westmont, IL (US); Cristian Leonardo Cortes, Chicago, IL (US); David J. Gosztola, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 350 days.

(21) Appl. No.: 17/226,734

(22) Filed: Apr. 9, 2021

(65) Prior Publication Data
US 2022/0326499 A1    Oct. 13, 2022

(51) Int. Cl.
*G02B 21/18* (2006.01)
*G02F 1/37* (2006.01)
*G06T 5/50* (2006.01)
*G01J 3/28* (2006.01)

(52) U.S. Cl.
CPC ............ *G02B 21/18* (2013.01); *G02F 1/37* (2013.01); *G06T 5/50* (2013.01); *G01J 3/2823* (2013.01); *G06T 2207/10056* (2013.01)

(58) Field of Classification Search
None
See application file for complete search history.

(56) References Cited

U.S. PATENT DOCUMENTS

| 2018/0252986 A1* | 9/2018 | Hyde ...................... G01S 17/89 |
| 2020/0284724 A1* | 9/2020 | Dholakia ............ G02B 21/0032 |
| 2020/0288107 A1* | 9/2020 | Hendrickson ........ H04N 13/275 |

OTHER PUBLICATIONS

Shapiro, Computational Ghost Imaging, Dec. 18, 2008, American Physical Society, pp. 1-4 (Year: 2008).*
Balu, et al., "Effect of excitation wavelength on penetration depth in nonlinear optical microscopy of turbid media," Journal of Biomedical Optics 14(1), 010508, 3 pages (2009).
Bina, et al., "Backscattering Differential Ghost Imaging in Turbid Media," Physical Review Letters 110(8), 083901, 5 pages (2013).
Campagnola, et al., "Three-Dimensional High-Resolution Second-Harmonic Generation Imaging of Endogenous Structural Proteins in Biological Tissues," Biophysical Journal 82(1), pp. 493-508 (2002).

(Continued)

*Primary Examiner* — James M Anderson, II
(74) *Attorney, Agent, or Firm* — FOLEY & LARDNER, LLP

(57) ABSTRACT

A system and methods for ghost imaging second harmonic generation microscopy. Imaging data is collected in parallel, providing faster imagine reconstruction and enabling reconstruction in scattering environments. Ghost imaging, split light beam interacting with a target and a second light beam unimpeded and not required to pass through the same background. A second harmonic generation image is reconstructed from the detected photons.

18 Claims, 3 Drawing Sheets

(56) References Cited

OTHER PUBLICATIONS

Dombeck, et al., "Uniform polarity microtubule assemblies imaged in native brain tissue by second-harmonic generation microscopy," Proceedings of the National Academy of Sciences 100(12), pp. 7081-7086 (2003).

Fan, et al., "Second Harmonic Generation from a Nanopatterned Isotropic Nonlinear Material," Nano Letters 6(5), pp. 1027-1030 (2006).

Ferri, et al., "Differential Ghost Imaging," Physical Review Letters 104(25), 253603, 4 pages (2010).

Ferri, et al., "High-Resolution Ghost Image and Ghost Diffraction Experiments with Thermal Light," Physical Review Letters 94(18), 183602, 4 pages (2005).

Gauderon, et al., "Three-dimensional second-harmonic generation imaging with femtosecond laser pulses," Optics Letters 23(15), pp. 1209-1211 (1998).

Gong & Han, "High-resolution far-field ghost imaging via sparsity constraint," Scientific Reports 5, 9280, 5 pages (2015).

Guo, et al., "Fully printed organic tandem solar cells using solution-processed silver nanowires and opaque silver as charge collecting electrodes," Energy & Environmental Science 8(6), pp. 1690-1697 (2015).

Hovhannisyan, et al., "Quantifying thermodynamics of collagen thermal denaturation by second harmonic generation imaging," Applied Physics Letters 94(23), 233902, 4 pages (2009).

Hsu, et al., "Second Harmonic Generation from Artificially Stacked Transition Metal Dichalcogenide Twisted Bilayers," ACS Nano 8(3), pp. 2951-2958 (2014).

Janisch, et al., "Extraordinary Second Harmonic Generation in Tungsten Disulfide Monolayers," Scientific Reports 4, 5530, 5 pages (2014).

Katz, et al., "Compressive ghost imaging," Applied Physics Letters 95, 131110, 3 pages (2009).

Kim, et al., "Second-Harmonic Generation of Single BaTiO3 Nanoparticles down to 22 nm Diameter," ACS Nano 7(6), pp. 5343-5349 (2013).

Li, et al., "User's Guide for TVAL3: Tv Minimization by Augmented Lagrangian and Alternating Direction Algorithms," Rice University Department of CAAM, retrieved from https://www.caam.rice.edu/~optimization/L1/TVAL3/v.beta/User_Guide_beta2.4.pdf, 8 pages (2010).

Malard, et al., "Observation of intense second harmonic generation from MoS2 atomic crystals," Physical Review B 87(20), 201401(R), 5 pages (2013).

Manaka, et al., "Direct imaging of carrier motion in organic transistors by optical second-harmonic generation," Nature Photonics 1, pp. 581-584 (2007).

Meyers, et al., "Turbulence-free ghost imaging," Applied Physics Letters 98, 111115, 3 pages (2011).

Olivieri, et al., "Hyperspectral terahertz microscopy via nonlinear ghost imaging," Optica 7(2), pp. 186-191 (2020).

Saldin, et al., "Ghost Imaging with X Rays," Physics 9, 103, 2 pages (2016).

Shapiro & Boyd, "The physics of ghost imaging," Quantum Information Processing 11, pp. 949-993 (2012).

Shapiro, "Computational ghost imaging," Physical Review A 78(6), 061802(R), 4 pages (2008).

Xu, et al., "Is ghost imaging intrinsically more powerful against scattering?," Optics Express 23(26), pp. 32993-33000 (2015).

Zhang, et al., "Tabletop x-ray ghost imaging with ultra-low radiation," Optica 5(4), pp. 374-377 (2018).

Zielinski, et al., "Second-Harmonic Generation from a Single Core/Shell Quantum Dot," Small 5(24), pp. 2835-2840 (2009).

Zipfel, et al., "Live tissue intrinsic emission microscopy using multiphoton-excited native fluorescence and second harmonic generation," Proceedings of the National Academy of Sciences 100(12), pp. 7075-7080 (2003).

Zoumi, et al., "Imaging cells and extracellular matrix in vivo by using second-harmonic generation and two-photon excited fluorescence," Proceedings of the National Academy of Sciences 99(17), pp. 11014-11019 (2002).

* cited by examiner

GHOST IMAGING SECOND HARMONIC GENERATION MICROSCOPY

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates to microscopy, specifically ghost imaging second harmonic generation microscopy.

BACKGROUND

Second harmonic generation ("SHG") is a second-order coherent process in which two lower energy photons of the same frequency are up-converted into one with twice the incident photon frequency. SHG has proven useful in a range of applications, such as bioscience and nanotechnology, with one such application being microscopic imaging spectroscopy. SHG imaging spectroscopy is particularly adept for revealing structural heterogeneity due to the associated non-centrosymmetry of microstructures including, but not limited to, defects, interfaces, crystalline grain boundaries, as well as cells, membranes, or lipids in biological materials, etc. These structures have increased SHG efficiency relative to the neighboring environment, making SHG microscopy a particular valuable approach for imaging in heterogeneous environments. As an additional benefit, SHG enables sub-wavelength spatial resolution.

SHG microscopy is useful for visualizing interfaces and sub-structures within a wide range of materials due to the propensity for SHG to occur in non-centrosymmetric environments. However, because SHG is a nonlinear process generally necessitating small focal sizes for higher peak powers, a raster scanning approach is usually needed to build an SHG image over a significant sample size or field of view.

Conventional approaches for applying SHG to microscopy have utilized traditional raster scanning of the fundamental laser beam or the sample itself. SHG microscopy with traditional raster scanning is a time-consuming process, in large part due to the sequential acquisition of a large number of measurements. While raster scanning is effective, there is a cost in terms of the time needed to acquire the image. Additionally, some materials cannot withstand the higher optical intensities within the small focal volume. In practical use, these limitations complicate SHG microscopy in non-ideal scenarios, such as where heavy scattering is present (e.g., imaging deep tissues and sub-surface opaque electronic or optical devices). Thus, it is of interest to develop an alternate SHG microscopy technique that is more efficient in terms of data acquisition rate, and less vulnerable to scattering media or optical damage of materials.

SUMMARY

One embodiment relates to a system for imaging an object. The system comprises a photon source providing an initial beam. A 2-dimensional patterning element is configured to interact with the initial beam. A beam splitter is positioned to receive the initial beam, after interacting with the 2-dimensional patterning element, and split the initial beam into a first split beam and a second split beam. A second harmonic generation device is positioned to interact with the first split beam and generate second-harmonic light that interacts with an object. A bucket detector is positioned to receive the first split beam after the first beam has interacted with an object. A 2-dimensional detector is positioned to receive the second split beam. The bucket detector and the 2-dimensional detector are in communication with coincidence electronics having executable instructions for reconstruction of the image as a GI-SHG image.

Another embodiment relates to a method of creating a GI-SHG image comprising, emitting a light beam from a photon source; imparting a 2-dimensional patterning to the light beam; interacting the light beam with a beam splitter, dividing the light beam into a first split beam and a second split beam; interacting the first beam with a second-harmonic device, generating second-harmonic light that interacts with an object; measuring the interacted first beam at a bucket detector is positioned to receive the first split beam after the first beam has interacted with an object; measuring the second beam at a 2-dimensional detector; forming a ghost image by cross-correlating measurements from the bucket detected with measurements from the 2-dimensional detector; and forming a GI-SHG image by applying a ghost imaging reconstruction based on the ghost image.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The foregoing and other features of the present disclosure will become more fully apparent from the following description and appended claims, taken in conjunction with the accompanying figures. Understanding that these figures depict only several implementations in accordance with the disclosure and are, therefore, not to be considered limiting of its scope, the disclosure will be described with additional specificity and detail through use of the accompanying figures.

In FIGS. 2(d)-2(f), the dashed line shows the cross-sectional location used for FIG. 2(b).

Reference is made to the accompanying figures throughout the following detailed description. In the figures, similar symbols typically identify similar components, unless context dictates otherwise. The illustrative implementations described in the detailed description, figures, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. Current SHG microscopy is reliant on sequential raster scanning. Described herein are devices and process for a SHG microscopy approach based on ghost imaging ("GI"). Embodiments herein provide for a parallel imaging data collection rather than sequentially as in raster scanning techniques. GI-SHG is further combined with compressive sensing to make substantial gains in reducing the amount of sampling required for image reconstruction. Beyond the faster image reconstruction, embodiments of GI-SHG are shown to have significant advantages for imaging in highly scattering environments, in contrast to current SHG microscopy techniques. It is believed that the GI-SHG approach is a background-free approach requiring spatial correlations between photons that travel two paths, with one path entirely devoid of sample interaction. This approach means that, photons scattered by the sample are less likely to be "counted" as a correlated hit at the single pixel (D1) detector for a given illumination beam pattern created by the diffuser (or DMD, SLM). Those photons traveling relatively unimpeded through the sample will be more likely to register as a "hit" on the single pixel detector and be correlated with a given illumination beam pattern. In this way, an image can be reconstructed from a set of the correlations, and the more scattered photons or those that become background do not contribute to the overall GI signal.

Figure 1A:
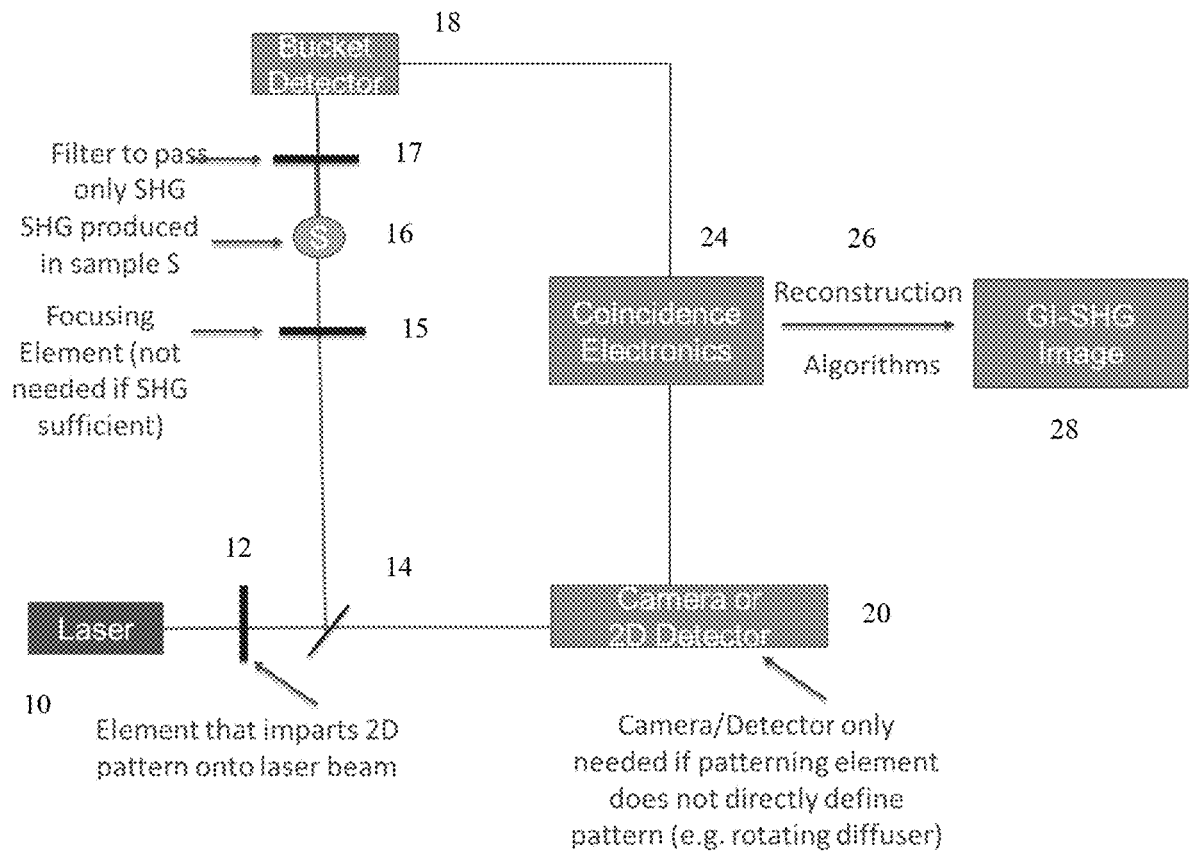
FIG. 1(a) shows the one embodiment of a system for ghost imaging.
Figure 1B:
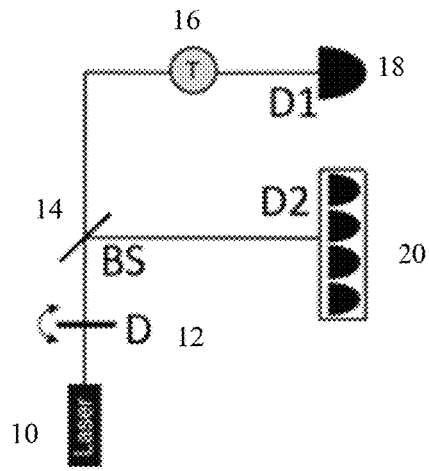
FIG. 1(b) shows another embodiment of a basic setup for ghost imaging.

GI is an optical technique for the retrieval of images via intensity correlations of two light beams. The general principle for GI is illustrated in FIG. 1(a) and a particular implementation is illustrated in FIG. 1(b). Photons are emitted from a laser 10 and pass through a 2-dimensoinal patterning element 12, such as a rotating ground glass diffuser 12, which imparts a unique spatial (speckled) pattern to the laser light. The beam is split by a beam splitter 14 to produce two paths of spatially correlated light, with one path containing the object to be imaged 16 followed by a single element (bucket) detector ("D1") 18 and the other path containing a two-dimensional camera pixel array ("D2") 20 for capturing the spatial pattern imparted to the laser beam. As shown in FIG. 1(a), a focusing element 15 and/or a filter element 17 maybe be utilized in the path of the light beam interacting with the object 16 and received by the element detector 18. For example, the focusing element 15 may focus the beam if the SHG would be insufficient otherwise. The focusing element 15 is position between the beam splitter 14 and the object 16. For embodiments using a filter 17, the filter allows only SHG to pass and is positioned between the sample 16 and the detector 18. By correlating the intensity of light at bucket detector D1 18 with the pattern measured at D2 20 and averaging over many (typically thousands of) measurements, an image of the object can be reconstructed. Because of the fact that only 2D information is gathered at the camera 20 registering photons that never interacted with the sample (object T 16), GI is associated with remote sensing and imaging concepts.

The embodiments of FIGS. 1(a) and 1(b) encompasses only illustrative approaches to imparting a pattern to the illumination beam. In the approach shown, a diffuser (D) rotates, and as it rotates, a pattern is read at the two dimensional detector (camera) at D2. However, there are multiple other approaches to imparting this illumination pattern. For example, either a spatial light modulator ("SLM") or a digital micromirror device ("DMD") can be programmed to provide time-varying structure to the illumination light. If the illumination light has a known and temporally stable spatial profile (e.g., a transverse electromagnetic mode $TEM_0$) prior to interacting with the SLM or DMD, then after the SLM or DMD, the spatial pattern is also known. This obviates the need for D2, since the light pattern is directly established by programming the DMD or SLM. Thus, there are multiple approaches to a key requirement of GI-SHG (and all GI): that the illumination pattern be known and well-defined. DMDs and SLMs have an additional advantage over the use of a diffuser, in that the light patterns can be imparted at a much higher refresh rate than can a rotating diffuser, making them a plausible component in commercial applications of GI-SHG. As described, the pattern can either be directly measured at D2, or directly imparted to the beam with a DMD or SLM, or another type of optical element that provides variable control of the 2D spatial profile of the illumination beam.

The resulting information from the 2D detector 20 and the bucket detector 18 are provided to processing device, generally revered to as coincidence electronics 24, to reconstruct the image as a GI-SHG image 28, for example by use of reconstruction algorithms 26.

This reconstruction from 2D information from photons that have not interacted with the sample provides the ability to operate in difficult environments where the target object to be imaged, such as in a turbulent environment or where there would otherwise be significant background interference. Also, GI is amenable to compressive sensing concepts by mathematical optimization approaches. For example, such optimizations can utilize the sparsity of an image relative to a particular basis to enable dramatic reductions in the number of measurements required to reconstruct an image. In one embodiment, this compression of measurements can typically be greater than a factor of ten, adding considerably to the time savings of GI.

GI, as used herein, includes other advanced forms of GI, such as computational GI ("cGI") and differential GI ("DGI"). In general, GI and DGI are powerful approaches for image acquisition in scattering environments. Thus, the application of various forms of GI to SHG microscopy can expedite imaging experiments in scattering environments, particularly at interfaces where SHG efficiency increases.

One embodiment relates to a process for ghost imaging second harmonic generation ("GI-SHG") microscopy. GI- SHG is differentiated from conventional GI at least because it provides an additional level of contrast against background illumination light. Due to the use of a background free photo stream, the image reconstruction is also better suited for use in scattering environments, such as in vitro biological imaging or in imaging of turbid systems or non-ideal systems such as imaging through opaque electrode layers in semiconductor devices. SHG is also a nonlinear effect that is selectively enhanced near structure in a material. This could be a range of types of structures, including sub-cellular structures, domain walls in polycrystalline materials, or a variety of defect types in materials. Because of the selective increase in efficiency of SHG at these type of structures, there is additional contrast relative to the background that can be obtained through GI-SHG.

The optical setup for one embodiment of a GI-SHG configuration is shown in FIG. 1(b). A beam of laser pulses, such as 50 femtosecond from a Ti-Sapphire oscillator (Spectra Physics Micra), centered at 800 nm with an average power of 400 mW at 80 MHz, is used as the fundamental incident light source. One of skill in art will appreciate that a range of photon sources may be used. A short optical pulse acts to increase the peak power and therefore the efficiency of SHG generation, any laser whether continuous or pulsed can work with GI-GHG as long as the mode profile is stable. For example, a multimode laser output may be used as long as the intensity profile is stable with time. In one embodiment, a 50 fs pulsed laser source is used, centered at 800 nm to illuminate the sample combined with the collection of only the frequency doubled 400 nm light from the sample at the bucket detector through the use of a short pass filter. In general, a pulsed laser is used to induce the SHG effect with sufficient intensity to perform GI-SHG. However, the light source need not necessarily be a femtosecond pulsed laser, but could also be a picosecond or nanosecond laser. In some embodiments, it is beneficial to use as high an efficiency detector as possible, depending upon the amount of SHG incident on the detector. The GI-SHG configuration will also be operable over a broad spectral range from the ultraviolet through the visible, near-infrared, and mid-infrared spectral ranges, as long as an appropriate detector is used for each spectral range. For some embodiments, a filter 17 is used after the sample to block the incident light wavelength so that maximum contrast with the SHG light is obtained. The filter 17 can be any sort of bandpass filter or notch filter, as long as the incident light is blocked from passing while the SHG light is allowed to pass through the filter.

Figure 1C:
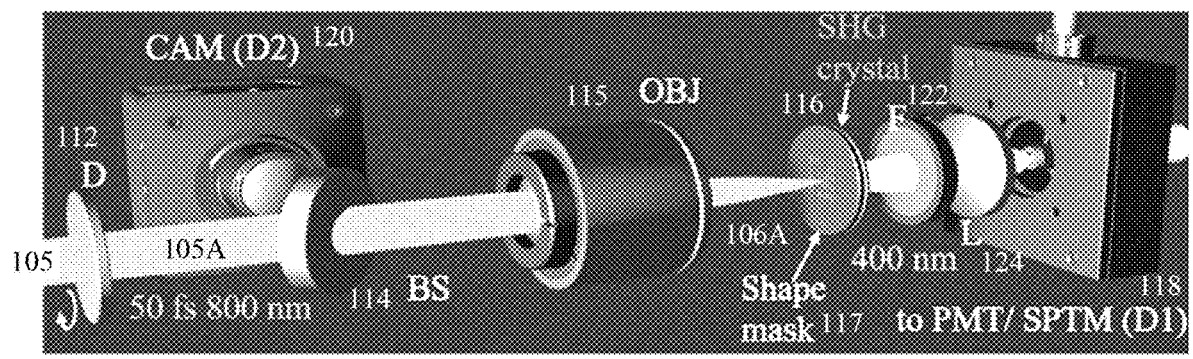
FIG. 1(c) shows one embodiment for an optical setup for ghost imaging of second harmonic generation ("GI-SHG") microscopy, with the optical path traveling from left to right.

In FIGS. 1(b) and 1(c), a key to the structures is as follows: D: diffuser; D1: bucket detector; D2: spatially resolving detector; CAM: camera; BS: beam sampler; OBJ: objective lens; SHG crystal: LiNbO$_3$ crystal; F: shortpass filter; L: lens; PMT: photomultiplier tube detector; and SPTM: spectrometer. In the illustrated embodiments, the beam 105 may pass through a waveplate (not shown) to maximize the SHG signal and a rotating diffuser 112 controlled by a computer, to create speckle patterns to form a speckle beam 105A. The beam 105A interacts with a beam splitter 114 to form a main portion 106A and a secondary portion 106B. In one embodiment, the secondary portion 106B is a small portion, such as approximately 5% of the speckle beam 105A, that is directed to a tube lens and a camera 120 to record the pattern, $P_i(x, y)$. It should be appreciated that the range of splitting percentage can be from a few percent (such as 2%) to nearly 100% (including any ranges there between), depending upon the efficiency of SHG in the sample and the degree to which the detector at the sample may be saturated. For example, a high degree of SHG may mean that only 10% of the light need go to the sample, and the remainder can be directed to D2 to improve signal to noise on the pattern. However, such a scenario is not required and expected to be rare, as in most embodiments and applications the majority of the light will go to the sample to increase signal to noise of the GI-SHG image. In the illustrated embodiment shown in FIG. 1(b), the main portion 106A of the speckle beam 105A goes through an objective lens 115, for example (10×NA=0.13). The range of objective lenses can be as varied as with a conventional optical microscope, and will depend upon the field of view over which an image is desired, the size of the microstructures to be imaged, and the required working distance (for example a device with 3D structure may require a longer working distance than a sample on a microscope slide). Also, as noted in paragraph [0010], other means to impart a pattern onto the illumination beam is to use a SLM or DMD. When using an SLM or DMD, a computer is used to set patterns that vary with time in a similar manner as the rotating diffuser, with the major exception that in the SLM and DMD cases, the pattern imparted via computer means that the pattern is known, so that D2 becomes unnecessary. This is a variant of ghost imaging called computational ghost imaging. Any approach that imparts a time-varying spatial pattern onto the illumination beam will work for GI-SHG microscopy described herein.

Following the objective lens 115, the main portion 106A of the beam interacts with the target object 16. In the experimental examples, a 1 mm thick LiNbO$_3$ SHG crystal 116 that is masked by a standardly available (e.g., commercially available from many vendors) United States Air Force ("USAF") resolution test target for microscopy (sometimes referred to as the "1951 USAF resolution test target" conforming to MIL-STD-150A) 117 was used, containing a series of microscopic lines and numbers of different sizes placed on the image plane of the objective lens. In the embodiment of the system used for experiments, due to the nature of the scattered beam after the diffuser, the spot size of the focused beam 106A at the sample is relatively large, with a diameter of 250 µm. In this way, the USAF target/ LiNbO$_3$ structure 117/116 acts as the object to be imaged. The parameters of the object that can be imaged are approximately the same as for a conventional optical microscope, meaning that a wide variety of materials (biological, organic, inorganic) can be imaged. Similar to an optical microscope, GI-SHG microscopy can be operated in transmission or reflection mode, such that the sample can be either transparent or opaque. As with conventional microscopy, structures to be imaged cannot be so small (nanoscale) so as to be below the diffraction limit for a given wavelength and objective numerical aperture.

After the beam interacts with the target object 16, the transmitted speckle beam 106A may be passed through optical filters, focusing lens or the like, for example a 450 nm shortpass filter 122 and a focusing lens 124. Any configuration that collects and focuses the light with the least amount of light, while selectively passing the SHG light to the detector is suitable. For example, focusing mirrors with appropriate radii of curvature may substitute for lenses or a grating could be used to select the SHG light rather than a filter. The beam 106A is detected by a fiber-coupled PMT (bucket detector) 118 for ghost imaging or using a spectrometer to measure the SHG spectrum. We note that the spectrometer is not required, it only functions as a diagnostic tool to be certain that only SHG light, rather than the incident light, is being detected. Once a given apparatus is shown to work well to select only SHG, the spectrometer may not be needed for a given application, but could be present to ensure accuracy of the GI-SHG microscopy image. In contrast to conventional GI, GI-SHG uses ultrafast optical pulses to create a high optical field strength in the sample, generally speaking femtosecond, picosecond, or nanosecond pulses for efficient SHG generation, and the collection of only the SHG light created in the sample at the bucket detector.

For GI-SHG data reconstruction, in one embodiment, $I_p(x, y)$ is set as a particular realization of the speckle field illuminating the object and $I_{SHG}(x, y)$ is the optical intensity of SHG from the sample. The GI-SHG image reconstruction utilizes the the background free SHG created in the sample and does not reconstruct images at the illuminating field wavelength. Assuming T (x, y) as the conversion function of the object, the intensity measured at the bucket detector $B_p$ for each speckle field is given by:

$$B_p = \int I_{SHG}(x, y) T(x, y) dx dy \quad (1)$$

To create a ghost image $\hat{T}$, the bucket detector measurements are cross-correlated with the intensities measured by the CCD camera, $$\hat{T}_{GI} = \frac{1}{N} \sum_{p=1}^{N} (B_p - \langle B \rangle) I_p(x, y) \quad (2)$$

where $\langle B \rangle = \frac{1}{N} \Sigma_p B_p$ is the average over N measurements.

Similarly, the ghost image reconstruction with DGI is given by:

$$\hat{T}_{DGI} = \frac{1}{N} \sum_{p=1}^{N} \left( B_p - \frac{\langle B \rangle}{\langle R \rangle} R_p \right) I_p(x, y) \quad (3)$$

where $R_p = \int I_p(x, y) dx dy$ and $$\langle R \rangle = \frac{1}{N} \Sigma_p R_p$$

is me average over N measurements, with other quantities being the same as above.

For some embodiments using cGI reconstruction, the problem can be expressed as the following objective function optimization problem:

$$\min_X \|\Psi X\|_1 \text{ subject to } Y = AX \quad (4)$$

where $\|.\|_1$ is the $l_1$ norm (i.e., the sum of the absolute values of each element. $\Psi$ is the total variation transform in which X is sparse, A is an M×N matrix corresponding to the speckle patterns, and Y is an m-dimensional vector of intensity measured by the bucket detector.

Experimental examples demonstrate transmissive SHG microscopy using speckled fundamental light from an 800 nm laser beam and reconstruct the SHG image at 400 nm using GI algorithms. In addition to traditional GI, experiments also tested the applicability of DGI and computational sensing GI ("cGI"). The results show that GI-SHG microscopy produces excellent SHG image quality. The desired image quality is maintained while requiring a fewer number of measurements than that required for raster scanning. In particular, the use of cGI reconstruction demonstrated beneficial results. Further, the results show such performance even in scattering media.

Figure 2A:
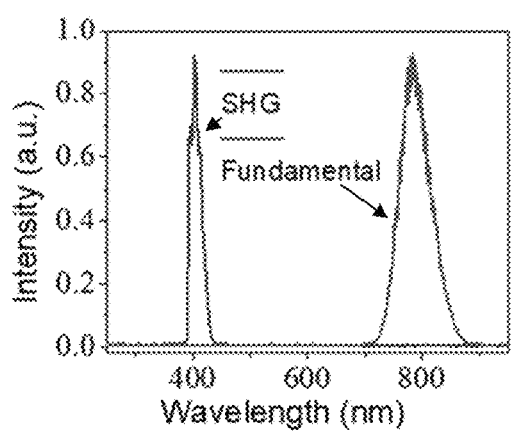
FIG. 2(a) shows spectra of the laser light at the fundamental and SHG wavelengths.

In FIG. 2(a), the transmitted spectra of both the fundamental and SHG photons are plotted. The SHG is shown to be exactly double the frequency of the fundamental, confirming the fact of second harmonic generation. A simple object was considered on the USAF target, a number "3" with a height of 140 μm, at the resolution of 100×100 pixels. The image of the object is shown in FIG. 2(c) and was captured using an epi microscope with the same objective lens used in the GI-SHG experiment. FIGS. 2(d)-2(f) show the reconstructed ghost images obtained by GI-SHG, DGI-SHG, and cGI-SHG using 7000 measurements, respectively. For the examples illustrated in FIGS. 2(d)-2(f), the object was imaged correctly using all the three reconstruction algorithms, which demonstrates the effectiveness of our GI-SHG approach. In practice, different image types may be reconstructed better with a particular reconstruction algorithm as may be known in the art based on these teachings, for example a spatially more complex image may be reconstructed at an improved degree relative to another reconstruction algorithm, on a case by case basis and considering some of the principles described below.

Figure 2B:
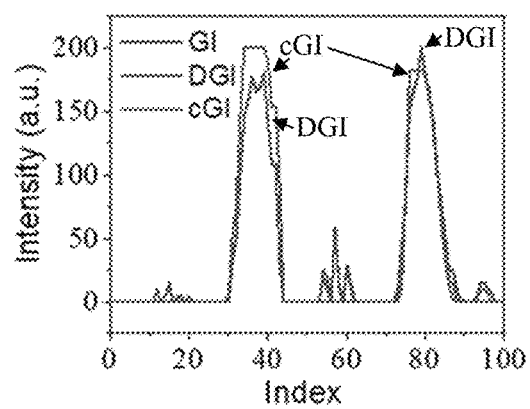
FIG. 2(b) shows cross-sectional plot of the reconstructed image using ghost imaging ("GI"), differential ghost imaging ("DGI"), or computational ghost imaging ("cGI") algorithms.
Figure 2C:
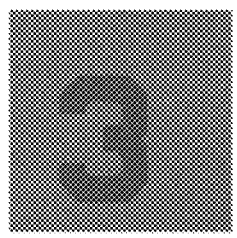
FIG. 2(c) shows a conventional optical microscope image of the object.
Figure 2D:
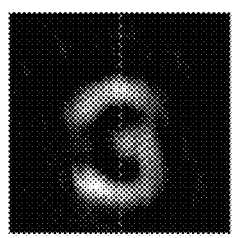
FIG. 2(d) shows reconstruction by the GI algorithm.
Figure 2E:
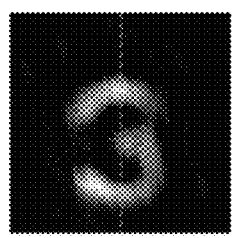
FIG. 2(e) shows reconstruction by the DGI algorithm.
Figure 2F:
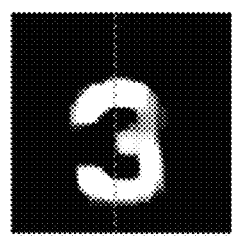
FIG. 2(f) shows reconstruction by the cGI algorithm.

To carefully compare the ghost imaging quality of these algorithms, cross sections of the ghost images are graphed in FIG. 2(b), from which we can make two conclusions. The first is that GI-SHG and DGI-SHG act very similarly. Less than 1% RMS noise is observed, and DGI-SHG is slightly lower at the noise level. This supports previous work showing that DGI reduces background noise relative to GI. We emphasize, however, that SHG is a background-free process, and so it is less vulnerable to noise. The second conclusion is that the cGI works better in reproducing the binary transfer function than the other two algorithms for the same number of measurements. This is likely due to the robustness of cGI when the number of measurements is less than the number of pixels in the 2D camera. The cGI algorithm given in Eq. (4) estimates the nearest pixel intensities, and if the gradient is small, then the intensity is estimated to be the same. This is the reason for the flat-topped cGI reconstruction shown in FIG. 2(b).

Figure 3A:
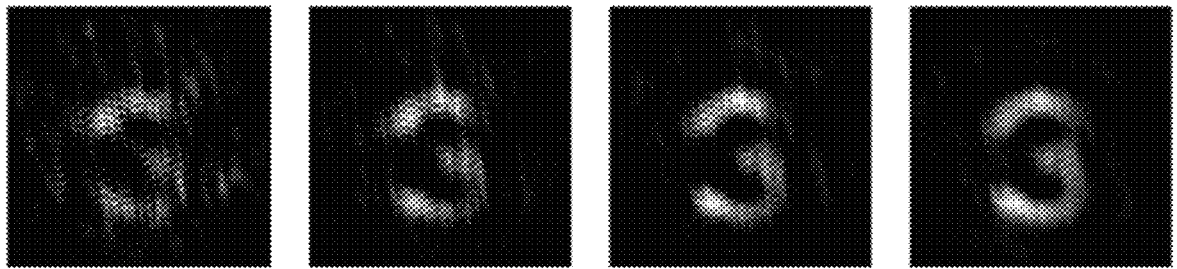
FIGS. 3(a)-3(c) show GI-SHG reconstruction using different algorithms: GI (FIG. 3(a)); DGI (FIG. 3(b)); and cGI (FIG. 3(c)). From left, first column: 500 measurements; second column: 1500 measurements; third column: 3500 measurements; and fourth column: 7000 measurements.
Figure 3B:
Figure 3C:
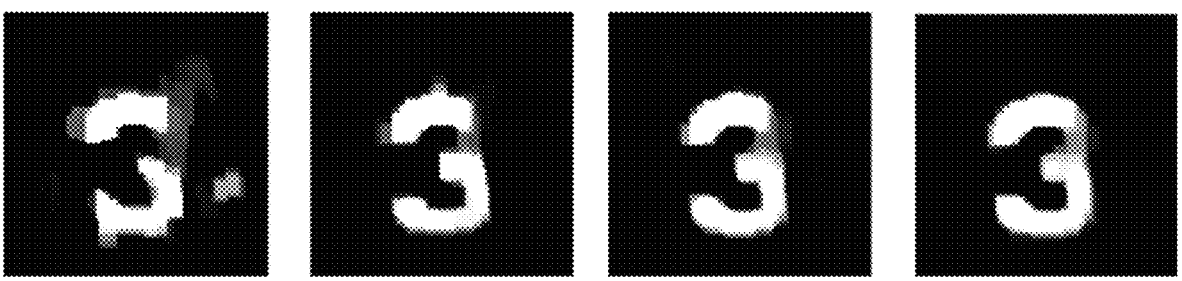

In FIGS. 3(a)-3(c), the reconstructed images are compared using the GI-SHG technique for different numbers of measurements and different algorithms. FIGS. 2(d)-2(f) show the results for 7000 measurements. It is shown that even with only 500 measurements, or 5% of the total number of pixels, GI demonstrates the ability to recover the object image. In contrast, if raster scanning for conventional SHG imaging was performed with the same number of pixels (100×100), then 10,000 data points would be required. Thus, the GI-SHG can significantly reduce the number of measurements required to reconstruct the object to be imaged. Particularly, cGI recovers the shape of the object at improved signal to noise, illustrating that cGI acts robustly for image reconstruction for GI-SHG.

Figures 4A, 4B, 4C:
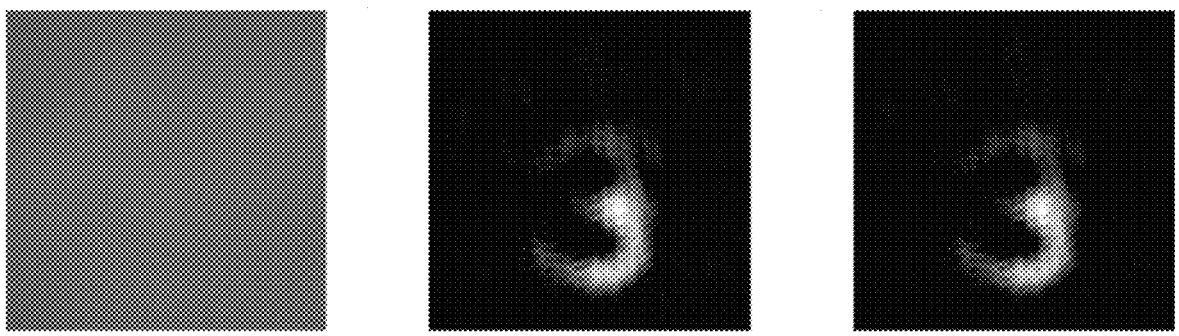
FIG. 4(a) is an image of the object in scattering media.
FIG. 4(b) is a ghost image by the GI algorithm.
FIG. 4(c) is a ghost image by the DGI algorithm.

One important advantage of ghost imaging over normal imaging is the robustness in scattering media. In experimental examples, GI-SHG was performed in simulated scattering media, which consisted of a 1 mm thick 220-grid ground glass diffuser placed on the detector side of the object. The sample was examined under an optical microscope and using a CCD camera, where the contrast of the image was barely visible as shown in FIG. 4(a). The GI-SHG technique reconstructs the image surprisingly well under these conditions, as shown in FIGS. 3(b) and 3(c). Here, the DGI algorithm recovers a slightly clearer image with a lower background than GI. Ghost imaging, in general, is very effective here because only those photons passing through the scattering media maintain spatial correlation with photons at D2, thereby efficiently removing scattered light with a different optical path.

Definitions

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A system for imaging an object, the system comprising:
a photon source providing an initial beam;
a 2-dimensional patterning element configured to interact with the initial beam;
a beam splitter positioned to receive the initial beam, after interacting with the 2-dimensional patterning element, and split the initial beam into a first split beam and a second split beam;
a second harmonic generation (SHG) crystal positioned to interact with the first split beam and generate second-harmonic light that interacts with the object;
a bucket detector positioned to receive the first split beam after the first split beam has interacted with the object; and
a 2-dimensional detector positioned to receive the second split beam;
wherein the bucket detector and the 2-dimensional detector are in communication with coincidence electronics having executable instructions for reconstruction of the object as a ghost imaging of second harmonic generation (GI-SHG) image.

2. The system of claim 1, wherein the 2-dimensional patterning element comprises a rotating diffuser element positioned between the photon source and the beam splitter.

3. The system of claim 1, further comprising a focusing element between the object and the beam splitter.

4. The system of claim 3, wherein the focusing element is a microscope objective lens.

5. The system of claim 3, further comprising a filter configured to allow only SHG light to pass and positioned between the object and the bucket detector.

6. The system of claim 5, wherein the filter comprises focusing lens of radii of curvature selected for passage of the SHG light.

7. The system of claim 5, wherein the filter comprises a physical grating.

8. The system of claim 1, wherein the photon source is a pulsed laser.

9. The system of claim 1, wherein the beam splitter splits the initial beam such that 2-99% of the initial beam is split into the first beam and the balance forms the second beam.

10. The system of claim 1, further including a spectrometer positioned in communication with the first split beam.

11. A method of creating a ghost imaging of second harmonic generation (GI-SHG) image comprising, emitting a light beam from a photon source;
imparting a 2-dimensional patterning to the light beam;
interacting the light beam with a beam splitter, dividing the light beam into a first split beam and a second split beam;

interacting the first split beam with a second-harmonic device, generating second-harmonic light that interacts with an object;

measuring the interacted first split beam at a bucket detector positioned to receive the first split beam after the first split beam has interacted with an object;

measuring the second split beam at a 2-dimensional detector;

forming a ghost image by cross-correlating measurements from the bucket detector with measurements from the 2-dimensional detector; and forming the GI-SHG image by applying a ghost imaging reconstruction based on the ghost image.

12. The method of claim 11, wherein the ghost imaging reconstruction utilizes a ghost imaging algorithm.

13. The method of claim 11, wherein the ghost imaging reconstruction utilizes a computational ghost imaging algorithm.

14. The method of claim 11, wherein the ghost imaging reconstruction utilizes a differential ghost imaging algorithm.

15. The method of claim 11, wherein the 2-dimensional patterning is applied by a rotating diffuser element positioned between the photon source and the beam splitter.

16. The method of claim 11, further comprising focusing the first split beam prior to interacting with the second-harmonic device.

17. The method of claim 11, further comprising, after generating second-harmonic light that interacts with an object, filtering to allow only second harmonic generation (SHG) light to pass to the bucket detector.

18. A system for imaging an object, the system comprising:

a photon source providing an initial beam;

a 2-dimensional patterning element configured to interact with the initial beam;

a beam splitter positioned to receive the initial beam, after interacting with the 2-dimensional patterning element, and split the initial beam into a first split beam and a second split beam;

a second harmonic generation (SHG) crystal positioned to interact with the first split beam and generate second-harmonic light that interacts with the object;

a bucket detector positioned to receive the first split beam after the first split beam has interacted with the object; and a 2-dimensional detector positioned to receive the second split beam;

a filter configured to allow only SHG light to pass and positioned between the object and the bucket detector;

wherein the bucket detector and the 2-dimensional detector are in communication with coincidence electronics having executable instructions for reconstruction of the object as a ghost imaging of second harmonic generation (GI-SHG) image.

* * * * *